United States Patent
Griffin

(10) Patent No.: US 10,128,956 B2
(45) Date of Patent: Nov. 13, 2018

(54) CALIBRATION OF PLUGGABLE OPTICAL MODULE

(71) Applicant: Oclaro Technology Limited, Northamptonshire (GB)

(72) Inventor: Robert Griffin, Northamptonshire (GB)

(73) Assignee: OCLARO TECHNOLOGY LIMITED, Northamptonshire (GB)

( * ) Notice: Subject to any disclaimer, the term of this patent is extended or adjusted under 35 U.S.C. 154(b) by 0 days.

(21) Appl. No.: 15/735,715

(22) PCT Filed: Jun. 10, 2016

(86) PCT No.: PCT/GB2016/051724
§ 371 (c)(1),
(2) Date: Dec. 12, 2017

(87) PCT Pub. No.: WO2016/203205
PCT Pub. Date: Dec. 22, 2016

(65) Prior Publication Data
US 2018/0183526 A1 Jun. 28, 2018

(30) Foreign Application Priority Data
Jun. 15, 2015 (GB) .................................. 1510449.0

(51) Int. Cl.
*H04B 10/50* (2013.01)
*H04B 10/588* (2013.01)
(Continued)

(52) U.S. Cl.
CPC ......... *H04B 10/50572* (2013.01); *G02F 1/21* (2013.01); *H04B 10/07955* (2013.01);
(Continued)

(58) Field of Classification Search
None
See application file for complete search history.

(56) References Cited

U.S. PATENT DOCUMENTS 4,768,186 A * 8/1988 Bodell ............... H04J 1/08
398/186
5,724,363 A * 3/1998 Breya ............... H04L 1/22
714/708
(Continued)

FOREIGN PATENT DOCUMENTS

WO WO 2005/125061 A1 12/2005
WO WO 2008/057904 A2 5/2008
(Continued)

OTHER PUBLICATIONS

Intellectual Property Office of the United Kingdom, Patents Act 1977: Search Report under Section 17(5), Application No. GB1510449.0, dated Dec. 22, 2015, 3 Pages.
(Continued)

*Primary Examiner* — Li Liu
(74) *Attorney, Agent, or Firm* — Fenwick & West LLP

(57) ABSTRACT

An optical communications apparatus comprising a host (100) and an optical module (200) comprising a Mach-Zehnder modulator (202), MZM, wherein the optical module is removably connected to the host via a connection path, the optical communications apparatus comprising: a signal generator (101) at the host, configured to generate a plurality of calibration signals at a plurality of frequencies; a host interface (102) configured to transmit the calibration signals to the optical module via the connection path; a module interface (201) configured to receive the transmitted calibration signals; wherein the MZM is configured to use the calibration signals to modulate a laser light source (206) and biased to a point at which average output power is proportional to the output modulated signal; an optical detector configured to measure an average magnitude of an output of the MZM when each of the calibration signals is used to modulate the laser light source; one of a host calibration unit (103) and a module calibration unit (203), configured to
(Continued)

determine a magnitude response of the connection path based on the measured average magnitudes and magnitudes of the respective calibration signals, and further configured to determine a pre-emphasis characteristic based on the magnitude response, the pre-emphasis characteristic for application to signals transmitted by the optical transmitter in use.

20 Claims, 2 Drawing Sheets

(51) Int. Cl.
    *G02F 1/21*     (2006.01)
    *H04B 10/079*     (2013.01)
    *H04B 10/564*     (2013.01)
    *G02F 1/225*     (2006.01)

(52) U.S. Cl.
    CPC ....... *H04B 10/5057* (2013.01); *H04B 10/564* (2013.01); *H04B 10/588* (2013.01); *G02F 1/225* (2013.01); *G02F 2001/212* (2013.01); *H04B 10/50575* (2013.01); *H04B 2210/254* (2013.01)

(56) References Cited

U.S. PATENT DOCUMENTS

| | | | |
|---|---|---|---|
| 9,722,705 B2* | 8/2017 | Blumenthal | ......... H04B 10/503 |
| 2003/0066947 A1* | 4/2003 | Alwan | ............... H04B 10/0799 250/206 |
| 2007/0241805 A1* | 10/2007 | Wood | ................... H04B 10/588 327/334 |
| 2008/0130083 A1* | 6/2008 | Yasuda | ............ H04B 10/50575 359/238 |
| 2011/0280582 A1* | 11/2011 | Piehler | ............. H04B 10/25751 398/117 |
| 2014/0169802 A1* | 6/2014 | Magri | .................. H04B 10/541 398/183 |
| 2015/0333860 A1* | 11/2015 | Rahn | ................... H04L 27/0008 398/34 |
| 2016/0254866 A1* | 9/2016 | Blumenthal | ......... H04B 10/503 398/197 |

FOREIGN PATENT DOCUMENTS

WO     WO 2008057904 A2 *   5/2008     ....... H04B 10/25754
WO     WO 2012/163419 A1   12/2012

OTHER PUBLICATIONS

Patent Cooperation Treaty, International Search Report, International Patent Application No. No. PCT/GB2016/051724, dated Sep. 21, 2016, 3 Pages.

Patent Cooperation Treaty, Written Opinion of the International Searching Authority, International Patent Application No. PCT/GB2016/051724, dated Sep. 21, 2016, 7 Pages.

* cited by examiner

CALIBRATION OF PLUGGABLE OPTICAL MODULE

RELATED APPLICATIONS

This application is a 35 U.S.C. 371 national stage filing of International Application No. PCT/GB2016/051724, filed on Jun. 10, 2016, which claims priority from United Kingdom Application No. GB1510449.0 filed on Jun. 15, 2015. The contents of the aforementioned applications are hereby incorporated by reference in their entireties.

TECHNICAL FIELD

The invention relates to a method and apparatus for the calibration of an optical transmitter. The optical transmitter may comprise a pluggable optical module and a host device to which the pluggable module connects and in particular, to a method and apparatus for the automated self-calibration of the module and host.

BACKGROUND

Communications devices are increasingly using pluggable modules that plug into a host via a connector, which may be an optical connector. Some components of the communications device will be on the pluggable module, with the other components being on the host, and communication between the components on the host and the components on the module will take place over the connector. Optics for the system are located on the pluggable module (as well as some electronic control circuitry), and the remainder of the device components (e.g. the electronic signal processing) may be located on the host.

Until recently, signalling over the optical connection was digital. However, as bandwidths increase in optical communications, complex modulation formats and Nyquist pulse shaping mean that the data transmitted can be treated as essentially analogue rather than digital. The electronics at the end points (i.e. at the host) are predominantly digital. Therefore, digital-analogue convertors (DACs) are used to translate between the two domains. The DAC is generally located in the host.

The DAC receives a digital electrical input signal and outputs an analogue electrical signal. The output analogue signal is then used as an input to an optical modulator (which has a further optical input for a laser carrier wave), which outputs the modulated optical signal for transmission on an external optical connection. The modulator is generally located in the pluggable module, which may have multiple independent modulators which are used to build up a final signal.

The analogue nature of the signalling can cause problems which are not faced by digital methods at a lower bitrate. Due to the characteristics of the transmission path, there will be differing levels of attenuation for different frequencies of the transmitted signal, i.e. different frequency components of the signal will experience different changes to magnitude and/or phase, which will cause distortion in the overall signal. The relationship between the change in magnitude of a transmitted sine wave and the frequency of the wave is called the magnitude response of the transmission path. The distortion experienced by an arbitrary transmitted signal can be calculated if the magnitude and phase response is known over the frequency range of the signal (e.g. the range of components determined by Fourier analysis). The inverse of this distortion can then be calculated, i.e. the waveform that must be transmitted to ensure that the desired waveform arrives at the receiver. This process is called pre-emphasis, since certain frequency components are emphasised in order to counteract the magnitude response.

There will naturally be some variance between devices, connectors, and the connection quality each time a connector is plugged in, which will cause distortion between the DAC and the modulator in the transmit circuit, and between the demodulator and the digital signal processor in the receiver circuit. This variable signal distortion can be partially compensated for in the receiver circuit following demodulation, provided the signal-to-noise ratio is high enough. However, distortion on the transmit circuit can make the signal much harder to distinguish from the noise introduced on the optical connection, which results in a significant loss of signal quality.

SUMMARY

According to an aspect of the invention, there is provided an optical module for removable connection via a connection path to a host module of an optical telecommunications apparatus, the optical module comprising: a module interface for receiving from the host over the connection path a plurality of calibration signals each at a plurality of frequencies; a Mach-Zehnder modulator, MZM, configured to use the calibration signals to modulate a laser light source and biased to a point at which average output power is proportional to the output modulated signal; an optical detector configured to measure an average magnitude of an output of the MZM when each of the calibration signals is used to modulate the laser light source; a module calibration unit configured to determine a magnitude response of the connection path based on the measured average magnitudes of the outputs and magnitudes of the respective calibration signals, and further configured to determine a pre-emphasis characteristic based on the magnitude response, the pre-emphasis characteristic for application to signals transmitted by the telecommunications apparatus in use.

Optionally, the magnitudes of the calibration signals are predetermined and stored in a memory of the optical module.

Optionally, the interface is further configured to receive data identifying the magnitudes of the calibration signals from the host.

Optionally, the module calibration unit is further configured to estimate a phase response of the connection path based on the determined magnitude response, wherein the pre-emphasis characteristic is further determined based on the phase response.

Optionally, the phase response is estimated as a Hilbert transform of the logarithm of the determined magnitude response.

Optionally, the module calibration unit is further configured to apply a bias voltage to the MZM to bias the MZM to the point at which average output power is proportional to the output peak-to-peak modulated signal.

Optionally, the biasing voltage biases the MZM at an operating point at a minimum or a maximum of an opto-electric transfer function for the MZM.

Optionally, the optical detector is a slow detector having a response time greater than a period of the plurality of calibration signals.

Optionally, the slow detector has a bandwidth in a range from 5 Hz to 100 Hz.

Optionally, the optical detector is configured to detect an average optical power output of the MZM.

Optionally, the module calibration unit is configured to block an output optical signal of the optical module while modulating the laser light source with the calibration signals.

Optionally, the module calibration unit is further configured to apply the pre-emphasis characteristic to signals transmitted from the optical communications apparatus.

Optionally, the optical module comprises a plurality of MZMs, and wherein each MZM is configured to use the calibration signals to modulate a laser light source.

According to a further aspect of the invention, there is provided a host for removable connection via a connection path to an optical module of an optical telecommunications apparatus, the host comprising: a signal generator configured to generate a plurality of calibration signals at a plurality of frequencies; a host interface configured to transmit the calibration signals to the optical module over the connection path, and to receive in response, data indicating an average magnitude of an output of a Mach-Zehnder modulator, MZM, when each of the calibration signals is used to modulate a laser light source and when the MZM is biased to a point at which average output power is proportional to the output modulated signal; a host calibration unit configured to determine a magnitude response of the connection path based on the received data indicating the average magnitude and magnitudes of the respective calibration signals, and further configured to determine a pre-emphasis characteristic based on the magnitude response, the pre-emphasis characteristic for application to signals transmitted by the telecommunications apparatus in use.

Optionally, the host calibration unit is further configured to estimate a phase response of the connection path based on the determined magnitude response, wherein the pre-emphasis characteristic is further determined based on the phase response.

Optionally, the phase response is estimated as a Hilbert transform of the logarithm of the determined magnitude response.

Optionally, the data indicating an average magnitude of an output of the MZM comprises data indicating an average optical power of the output of the MZM.

Optionally, the MZM is biased to an operating point at a minimum or a maximum of an opto-electric transfer function for the modulator.

Optionally, the host calibration unit is further configured to apply the pre-emphasis characteristic to signals transmitted from the optical communications apparatus.

According to the invention in a further aspect, there is provided an optical communications apparatus comprising a host and an optical module comprising a Mach-Zehnder modulator, MZM, wherein the optical module is removably connected to the host via a connection path, the optical communications apparatus comprising: a signal generator at the host, configured to generate a plurality of calibration signals at a plurality of frequencies; a host interface configured to transmit the calibration signals to the optical module via the connection path; a module interface configured to receive the transmitted calibration signals; wherein the MZM is configured to use the calibration signals to modulate a laser light source and biased to a point at which average output power is proportional to the output modulated signal; an optical detector configured to measure an average magnitude of an output of the MZM when each of the calibration signals is used to modulate the laser light source; one of a host calibration unit and a module calibration unit, configured to determine a magnitude response of the connection path based on the measured average magnitudes and magnitudes of the respective calibration signals, and further configured to determine a pre-emphasis characteristic based on the magnitude response, the pre-emphasis characteristic for application to signals transmitted by the optical transmitter in use.

BRIEF DESCRIPTION OF THE DRAWINGS

FIG. 2 is a graph showing measured and derived phase response;

DETAILED DESCRIPTION

The most accurate approach to determining the pre-emphasis required for an optical transmitter comprising a host and a pluggable module would be to calibrate the system when the module is plugged in to the host. It is desirable that this calibration solution can be performed automatically, and without the need for additional components. A method and apparatus for performing such a calibration is described below.

Figure 1:
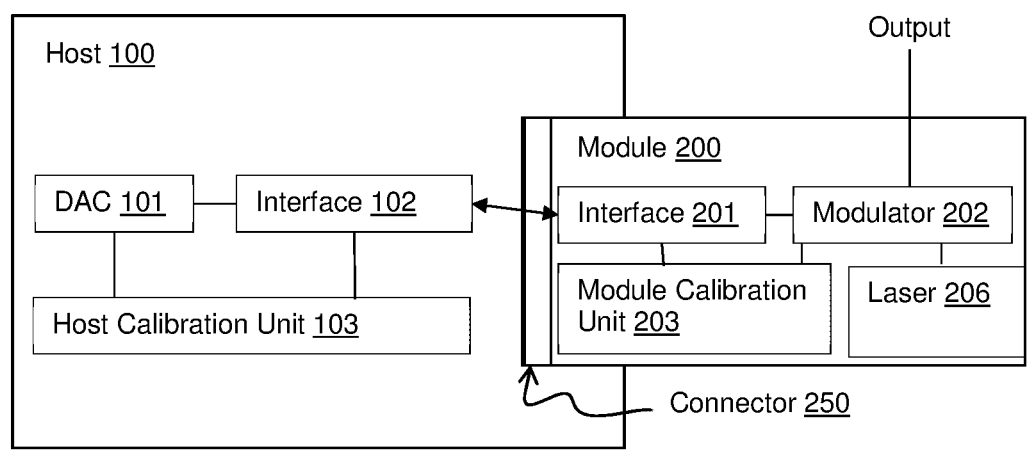
FIG. 1 is a schematic diagram showing a host and a pluggable optical module.

FIG. 1 shows a schematic of a communications apparatus comprising a host board 100 and a pluggable optical module 200. The host board 100 comprises a DAC or other signal generator 101, a host interface 102 communicates with the pluggable optical module 200 over a connector 250, and a host calibration unit 103 which controls a calibration procedure.

The pluggable optical module 200 comprises a module interface 201 which communicates with the host 100 over the connector 250, a modulator 202 which controls the modulation of the output laser signals of the communications apparatus, and a module calibration unit 203 which controls a calibration procedure of the communications apparatus.

The host calibration unit 103 and module calibration unit 203 may be implemented as software running on a processor, as an application specific integrated circuit (ASIC), or by any other suitable means. As an alternative to separate module and host calibration units 103, 203, there may be a single calibration unit in either the optical module 200 or the host 100, with suitable connections provided to allow it to control components in the other part of the system.

In operation, the DAC 101 may produce analogue data signals that are passed to the modulator 202 via the host interface 102, the connector 250 and the module interface 201. The data is used by the modulator 202 to modulate an output of the laser 206 to produce a modulator output.

The modulator 202 may be an electro-optic (EO) modulator, i.e. one which makes use of an electro-optic substance which changes its optical properties in response to applied electric field. In exemplary pluggable optical modules, the modulator is a Mach-Zehnder modulator (MZM). The calibration process is therefore the calibration of the electro-optic response of the modulator to suit the frequency and/or phase characteristics of the connector 250.

Generally, an exemplary calibration process comprises the following steps:

Generating a number of calibration signals, each at one of a plurality of frequencies, at the host 100 and sending each calibration signal to the pluggable optical module 200 via the connector 250;

Using each calibration signal to drive the modulator 202;

Measuring a magnitude of the modulator output signal when driven by each calibration signal;

Determining a magnitude response of the connection between the host 100 and the optical module 200 based on the measured modulator output magnitudes and the respective calibration signal magnitudes;

Determining a required pre-emphasis from the determined magnitude response.

Going into the method in more detail, the calibration signals are generated by the DAC 101 and sent to the pluggable optical module 200 via the interface 102, connector 250, and interface 201.

In exemplary methods and apparatus, a MZM may be biased to a point at which average output power is proportional to the output modulated signal before being driven by the plurality of calibration signals. The MZM may be biased to a point at which average output power is proportional to the peak-to-peak output modulated signal. For example, the MZM may be biased to a minimum power transmission point or a maximum power transmission point. Biasing to a minimum or maximum transmission point may comprise biasing the modulator 202 such that the operating point is at a minimum or maximum (respectively) on the opto-electric transfer function for the modulator. For a MZM, the opto-electric transfer function is typically a raised cosine.

Biasing at a minimum or maximum transmission point on the transfer function ensures that the average output optical power is proportional to the output peak-to-peak modulated signal. Using this relationship, a slow photodetector may be used to determine the modulation magnitude of the modulator output for any frequency without additional calibration. The average optical power of the modulator output is mathematically related to (and may be used to determine) the signal driving the modulator 202 after transmission from the DAC 101. This in turn allows the determination of the magnitude of the response of the transmission path from the DAC 101 to the modulator 202.

As used herein, the term "slow" or "low bandwidth" detector encompasses a detector that has a response time greater than a period of a signal to be detected and a bandwidth less than a frequency of the signal to be detected. The response time may be very much greater than the period of the signal to be detected and the detector bandwidth may be very much less than the frequency of the signal to be detected. Exemplary slow or low bandwidth detectors may have a response time greater than a plurality of periods of the signal to be detected and, specific exemplary detectors may have a response time in a range from $1 \times 10^8$ periods to $3 \times 10^9$ periods of the signal to be detected. That is, the electro-optic bandwidth of the signal to be detected may be in a range from $1 \times 10^8$ to $3 \times 10^9$ times greater than the bandwidth of the slow detector. Exemplary slow detectors may have a bandwidth of around 10 Hz and may be used to determine an average power of a signal having a bandwidth of around 20 GHz. Slow detectors may be configured to determine an average power of a signal at a frequency one or more orders of magnitude greater than the bandwidth of the detector. The slow detector may be a monitor photo-receiver. The slow detector may produce an output proportional to the time-average of the optical power incident on the detector. Exemplary slow detectors may be photodetectors and this exemplary detector is referred to in the remainder of this document.

The modulator 202 may comprise the detector, although in other arrangements the detector may be separate from the modulator 202 and may even be located off the optical module 200.

Using this relationship, the slow photodetector may be used to determine the average power of the modulator output. The average power of the modulator output is proportional to (and may be used to determine) the signal driving the modulator 202 after transmission from the DAC 101. This in turn allows the determination of the magnitude of the response of the transmission path from the DAC 101 to the modulator 202.

The calibration procedure will result in the modulator 202 generating output which could look similar to actual data if it were transmitted over the external optical connection. In order to ensure that no spurious signals are sent over the external optical connection, output from the pluggable optical module 200 may be blocked during calibration.

Once the magnitude has been measured at the modulator 202 for each of the frequencies to be tested, the magnitude response is calculated. In one embodiment, this is performed at the module calibration unit 203, which either obtains the original transmitted magnitudes from the host 100, or retrieves them from a memory (in the case where the magnitudes used are standardised). In an alternative embodiment, calculation of the magnitude response is performed at the host calibration unit 103, and the module calibration unit 203 provides the measured amplitudes at the modulator 202 to the host calibration unit 103. In either case, the transmitted amplitudes from the DAC 101 are compared to the measured amplitudes at the modulator 202 for each of the transmitted frequencies, and this is used to construct a model for the magnitude response.

As an additional step, the calibration may involve using the magnitude response to estimate the phase response of the signal path (i.e. how the phase shift of a sine wave signal varies with frequency). The characteristics of the connection 250 may be approximated as a "minimum phase" system, i.e. a system where both the system and its inverse are causal and stable. The phase response may then be calculated by applying the Hilbert transform to the logarithm of the magnitude response, i.e.:

$$\varphi = kH(\log M)$$

Where $\varphi$ is the phase response, M is the magnitude response, k is a constant (which depends on the units used for magnitude and phase) and H( ) is the Hilbert transform operator defined as:

$$H\{x(t)\} = \frac{1}{\pi} \int_{-\infty}^{\infty} \frac{x(t)}{t - \tau} d\tau$$

As shown in FIG. 2, this gives a good estimate of the phase response up to significant frequencies. This function may be calculated by a processor, ASIC or other means which is configured to perform the calculation or calculate a suitable approximation to the function above.

Once the magnitude response (and optionally the phase response) has been determined, pre-emphasis characteristics for the host transmitter can be derived from the magnitude response (and phase response, if it was calculated). The pre-emphasis may be substantially the inverse of the determined response. A pre-emphasis filter may be determined. The derivation of the pre-emphasis characteristics and the pre-emphasis filter can occur at either the host calibration unit 103 or the module calibration unit 203. The pre-emphasis filter is provided to the host calibration unit 103, which applies the filter to the DAC 101. The pre-emphasis filter is then applied to outgoing signals from the host 100, in order to correct for the properties of the signal path via the connector 250. The pre-emphasis filter will be a function of the frequency of the outgoing signal, i.e. the amount of pre-emphasis applied will vary depending on the frequency components of the outgoing signal.

The self-calibration procedure disclosed above may be controlled entirely by the host calibration unit 103 and/or module calibration unit 203 with no need for external intervention or input. The host calibration unit 103 and/or module calibration unit 203 may be configured to perform the calibration automatically, e.g. when the optical module 200 is first plugged in to the host 100, periodically, or during periods where no signals are being transmitted over the external optical link.

Where the pluggable optical module 200 comprises multiple modulators 202, the calibration may be performed separately for each modulator 202.

Figure 3:
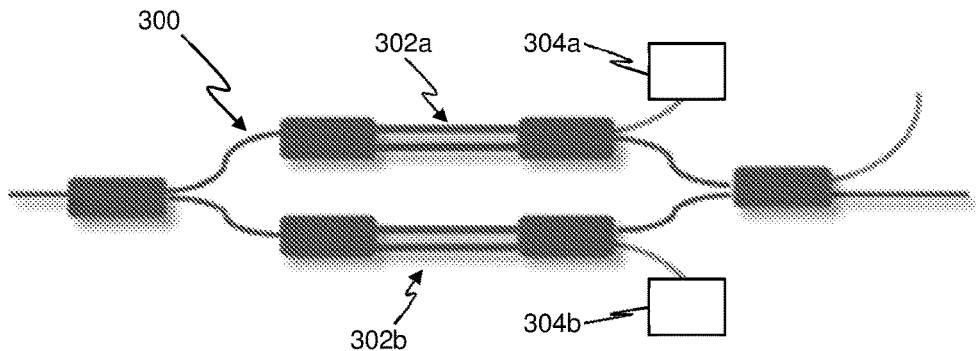
FIG. 3 is a schematic diagram of a pluggable optical module comprising multiple modulators.

FIG. 3 shows a quadrature phase shift keying (QPSK) MZM 300 in a single polarisation configuration. The single polarisation QPSK modulator comprises two MZMs 302a, 302b arranged in parallel such that a first modulator 302a is in phase (I) and a second modulator 302b is quadrature phase (Q). A polarisation (P) bias voltage may also be applied at the output of each of the I and Q modulators 302a, 302b. In order to implement the method disclosed above, the output photocurrent may be measured separately for each modulator at photodetectors 304a, 304b, and magnitude response, phase response, and pre-emphasis may be calculated separately for the I modulator 302a and Q modulator 302b.

Figure 4:
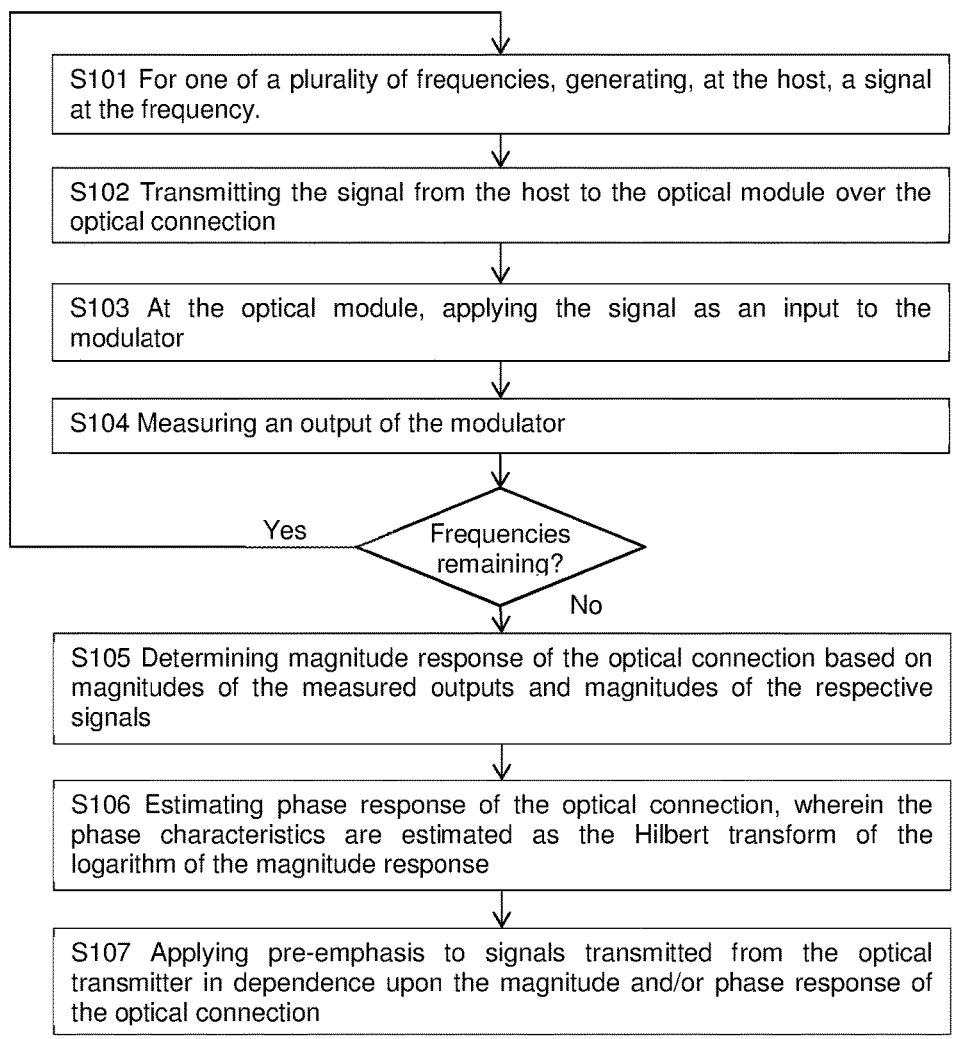
FIG. 4 is a flowchart showing a method of calibrating an optical module.

FIG. 4 is a flowchart of an exemplary method for calibration of a pluggable optical module 200 and/or host 100.

In step S101, the host 100 generates a calibration signal at one of a plurality of frequencies, which is then transmitted S102 to the pluggable optical module 200 over the connection 101, 102, 250, 201 to be calibrated. The pluggable optical module 200 applies S103 the signal as an input to the modulator 202 and measures S104 a corresponding output of the modulator 202. Steps S101 to S104 are repeated for each of the plurality of calibration signals at the plurality of frequencies. In step S105, the magnitude response of the connection is determined based on magnitudes of the measured modulator outputs and magnitudes of the respective calibration signals. In step S106, the phase response of the connection is estimated based on the determined magnitude response. This may be done by taking the Hilbert transform of the logarithm of the magnitude response. Pre-emphasis is then applied to signals transmitted from the host in dependence upon the magnitude and/or phase response of the connection.

Returning again to FIG. 1, the host 100 comprises a DAC/signal generator 101, an interface 102, and a host calibration unit 103. The signal generator 101 is configured to generate signalling, the interface 102 is configured to communicate with the pluggable optical module 200. The host calibration unit 103 is configured to cause the signal generator 101 to generate calibration signals at each of a plurality of frequencies and to cause the interface to transmit the signals to the optical module 200.

The optical module 200 comprises an interface 201, a modulator 202, and a calibration unit 203. The interface 201 is configured to communicate with the host 100. The modulator 202 is configured to modulate an output from a laser 206. The module calibration unit 203 may be configured, upon receipt of each calibration signal at the interface 201, to:

apply the calibration signal as an input to the modulator 202; and measure an output of the modulator 202.

One of the host calibration unit 103 and the module calibration unit 203 may be further configured to determine magnitude response of the connection based on magnitudes of the measured outputs and magnitudes of the respective signals.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

It will be appreciated by the person of skill in the art that various modifications may be made to the above described embodiment without departing from the scope of the present invention.

The invention claimed is:

1. An optical module for removable connection via a connection path to a host module of an optical telecommunications apparatus, the optical module comprising:
    a module interface for receiving from the host over the connection path a plurality of calibration signals each at a plurality of frequencies;
    a Mach-Zehnder modulator, MZM, configured to use the calibration signals to modulate a laser light source and biased to a point at which average output power is proportional to an amplitude of the output modulated signal;
    an optical detector configured to measure an average magnitude of an output of the MZM when each of the calibration signals is used to modulate the laser light source; and
    a module calibration unit configured to determine a magnitude response of the connection path based on the measured average magnitudes of the outputs and magnitudes of the respective calibration signals, and further configured to determine a pre-emphasis characteristic based on the magnitude response, the pre-emphasis characteristic for application to signals transmitted by the telecommunications apparatus in use.

2. The optical module according to claim 1, wherein the magnitudes of the calibration signals are predetermined and stored in a memory of the optical module.

3. The optical module according to claim 1, wherein the interface is further configured to receive data identifying the magnitudes of the calibration signals from the host.

4. The optical module according to claim 1, wherein the module calibration unit is further configured to estimate a phase response of the connection path based on the determined magnitude response, wherein the pre-emphasis characteristic is further determined based on the phase response.

5. The optical module according to claim 4, wherein the phase response is estimated as a Hilbert transform of the logarithm of the determined magnitude response.

6. The optical module according to claim 1, wherein the module calibration unit is further configured to apply a bias voltage to the MZM to bias the MZM to the point at which average output power is proportional to the output modulated signal.

7. The optical module according to claim 6, wherein the biasing voltage biases the MZM at an operating point at a minimum or a maximum of an opto-electric transfer function for the MZM.

8. The optical module according to claim 1, wherein the optical detector is a slow detector having a response time greater than a period of the plurality of calibration signals.

9. The optical module according to claim 8, wherein the slow detector has a bandwidth in a range from 5 Hz to 100 Hz.

10. The optical module according to claim 1, wherein the optical detector is configured to detect an average optical power output of the MZM.

11. The optical module according to claim 1, wherein the module calibration unit is configured to block an output optical signal of the optical module while modulating the laser light source with the calibration signals.

12. The optical module according to claim 1, wherein the module calibration unit is further configured to apply the pre-emphasis characteristic to signals transmitted from the optical communications apparatus.

13. The optical module according to claim 1, comprising a plurality of MZMs, and wherein each MZM is configured to use the calibration signals to modulate a laser light source.

14. A host for removable connection via a connection path to an optical module of an optical telecommunications apparatus, the host comprising:
    a signal generator configured to generate a plurality of calibration signals at a plurality of frequencies;
    a host interface configured to transmit the calibration signals to the optical module over the connection path, and to receive in response, data indicating an average magnitude of an output of a Mach-Zehnder modulator, MZM, when each of the calibration signals is used to modulate a laser light source and when the MZM is biased to a point at which average output power is proportional to an amplitude of the output modulated signal; and
    a host calibration unit configured to determine a magnitude response of the connection path based on the received data indicating the average magnitude and magnitudes of the respective calibration signals, and further configured to determine a pre-emphasis characteristic based on the magnitude response, the pre-emphasis characteristic for application to signals transmitted by the telecommunications apparatus in use.

15. The host according to claim 14, wherein the host calibration unit is further configured to estimate a phase response of the connection path based on the determined magnitude response, wherein the pre-emphasis characteristic is further determined based on the phase response.

16. The host according to claim 15, wherein the phase response is estimated as a Hilbert transform of the logarithm of the determined magnitude response.

17. The host according to claim 14, wherein the data indicating an average magnitude of an output of the MZM comprises data indicating an average optical power of the output of the MZM.

18. The host according to claim 17, wherein the MZM is biased to an operating point at a minimum or a maximum of an opto-electric transfer function for the modulator.

19. The host according to claim 14, wherein the host calibration unit is further configured to apply the pre-emphasis characteristic to signals transmitted from the optical communications apparatus.

20. An optical communications apparatus comprising a host and an optical module comprising a Mach-Zehnder modulator, MZM, wherein the optical module is removably connected to the host via a connection path, the optical communications apparatus comprising:
- a signal generator at the host, configured to generate a plurality of calibration signals at a plurality of frequencies;
- a host interface configured to transmit the calibration signals to the optical module via the connection path;
- a module interface configured to receive the transmitted calibration signals;
- wherein the MZM is configured to use the calibration signals to modulate a laser light source and biased to a point at which average output power is proportional to an amplitude of the output modulated signal;
- an optical detector configured to measure an average magnitude of an output of the MZM when each of the calibration signals is used to modulate the laser light source; and
- one of a host calibration unit and a module calibration unit, configured to determine a magnitude response of the connection path based on the measured average magnitudes and magnitudes of the respective calibration signals, and further configured to determine a pre-emphasis characteristic based on the magnitude response, the pre-emphasis characteristic for application to signals transmitted by the optical transmitter in use.

* * * * *